United States Patent [19]
Biggs

[11] Patent Number: 5,361,751
[45] Date of Patent: Nov. 8, 1994

[54] COMBINATION HOT AIR FURNACE AND HOT WATER HEATER

[76] Inventor: Robert C. Biggs, 3356 Lake Crest La., Roswell, Ga. 30075

[21] Appl. No.: 168,057

[22] Filed: Dec. 15, 1993

[51] Int. Cl.$^5$ .............................................. F24D 9/00
[52] U.S. Cl. ...................................... 126/101; 237/19
[58] Field of Search ................. 126/101, 110 R, 99 R, 126/116 R; 122/17, 19; 237/16, 19, 55, 17, 8 R

[56] References Cited

U.S. PATENT DOCUMENTS

| | | | |
|---|---|---|---|
| 1,633,759 | 6/1927 | Bresse, Jr. ........................... | 126/101 |
| 2,294,579 | 9/1942 | Sherman ............................... | 126/101 |
| 2,789,769 | 4/1957 | Dalin .................................... | 237/17 |
| 2,833,267 | 5/1958 | Handley ............................... | 126/101 |
| 3,033,192 | 5/1962 | Bogren ................................. | 126/101 |
| 3,198,190 | 8/1965 | Gordon ................................ | 126/101 |
| 3,269,382 | 8/1966 | Ronan et al. ......................... | 126/101 |
| 3,763,849 | 10/1973 | Pfluger et al. ...................... | 126/101 |
| 4,640,458 | 2/1987 | Casier et al. ........................ | 126/101 |
| 5,046,478 | 9/1991 | Clawson ............................... | 126/110 |

OTHER PUBLICATIONS

SABH Worldwide Water Heater Group, SABH Comfort Systems, Jan. 1993, pp. 2–4.
SABH Worldwide Water Heater Group, Polaris Case History, Jan. 1993, pp. 1–4.
Mor–Flo Industries, Inc., Integra Sales Brochure, 1989 pp. 1–3.
Mor–Flo Industries, Inc., Mor–Flo American Comfort Systems Brochure, date unknown, pp. 1–4.

Primary Examiner—James C. Yeung
Attorney, Agent, or Firm—Hopkins & Thomas

[57] ABSTRACT

A combination hot air furnace and hot water heater (10) having a furnace (20), a gas flow control valve (40) and a hot water heater (60) constructed as an integral assembly. Furnace (20) has furnace gas burner (33) supported below furnace heat exchanger (32). Furnace heat exchanger (32) is supported within conduit (24) through which air is passed for heating. Gas flow control valve (40) is sealingly mounted upon the top outlet (36) of furnace heat exchanger (32), and may selectively direct the heat of combustion from furnace gas burner (33) toward water tank (62) for heating water within the water tank. Gas flow control valve (40) may also seal off furnace heat exchanger (32) from the flow control valve and draw outside combustion air into valve body (42) through side wall opening (48) for providing combustion air for water tank gas burner (64).

17 Claims, 3 Drawing Sheets

COMBINATION HOT AIR FURNACE AND HOT WATER HEATER

FIELD OF THE INVENTION

This invention relates to hot air furnaces and hot water heaters. More particularly, this invention relates to a combination hot air furnace and hot water heater in which both the hot air furnace and hot water heater are housed in one integral assembly.

BACKGROUND OF THE INVENTION

Hot air furnaces and hot water tanks are well known in the art. Hot air furnaces and hot water tanks are typically considered to be separate fields of art, but there have been instances in which hot air furnaces have been used for generating hot water, and still other instances where hot water tanks have also been used for generating heated air.

Prior art hot air furnaces include furnaces fired by gas, such as natural gas or liquid propane gas, as well as furnaces fired by heating oil. These hot air furnaces usually are operated as forced air furnaces in which cold return air is drawn from throughout the building structure in which the furnace is installed and then passed across a heat exchanger within the furnace so that heated air exits out of the furnace and is forced through a duct system throughout the building structure. Hot water tanks, on the other hand, typically are heated by either gas, such as natural gas or liquid propane, or by electricity.

The situation thus arises that waste heat passing through the flue to the atmosphere, that is, the heat of combustion utilized to provide a source of heat for heating water in a water heater, and the heat of combustion for producing heated air in a furnace, is exhausted from the water heater or furnace through a flue and out of the building structure in which the furnace or water heater is installed. This can result in inefficiencies in that the waste heat exhausted from the structure to the atmosphere still contains a significant amount of heat energy which has not been otherwise put to a useful purpose.

Examples of earlier approaches undertaken in the effort to utilize waste heat from producing hot water can be found in U.S. Pat. No. 3,269,382 to K.M. Ronan, et al., which discloses an apparatus functioning as a combined water and space heater. An insulated housing encloses a hot water tank and air is passed through the space between the exterior surface of the hot water heater and its insulated housing, drawing heat from the exterior of the hot water tank. The heated air is then passed into the space surrounding the hot water tank.

Another attempt to provide both hot water and heated air is found in U.S. Pat. No. 2,789,769 to D. Dalin, teaching an apparatus in which water is boiled to provide a heat exchange medium for heating air to be forced throughout the structure, and having a second heat exchanger contained within the water to be boiled for heating domestic water. U.S. Pat. No. 3,333,192 to S. Bogren discloses an apparatus in which heat from a forced air furnace is utilized to heat water held in a separate hot water tank through the use of dual heat exchangers, one located in the furnace, and one located in the hot water tank.

A more recent attempt to provide an apparatus for both heating air and water is disclosed in U.S. Pat. No. 5,046,478 to Clawson, which discloses a recuperative furnace in which the heat exchange medium, water, is heated beyond its dew point and passed over a heat exchanger in which water is contained, thus providing a heated water source for both domestic hot water and for a second heat exchanger located in the plenum of the furnace over which space air is blown for heating the structure in which the furnace is installed.

None of the prior art known to the inventor discloses a system in which the waste heat in the flue gases that would normally pass from the furnace to the atmosphere is selectively directed toward a hot water tank for heating the water. Moreover, none of these devices teaches an apparatus or a method in which the water tank has a separate burner for heating water when the heat of combustion from the hot air furnace is insufficient to heat water, or when the furnace is merely used for circulating ambient or cooled air throughout the structure in which the device is installed.

SUMMARY OF THE INVENTION

Briefly described, the present invention comprises an integral apparatus for heating both air and water within either a residential or commercial structure.

The combination hot air furnace and hot water tank has a hot water tank having a cold water inlet and a hot water outlet, with a gas burner positioned below the water tank for emitting a gas flame for heating the water tank, a furnace heat exchanger having an inlet and an outlet positioned below the water tank gas burner within a conduit for directing a flow of air across the furnace heat exchanger, a furnace gas burner positioned below the furnace heat exchanger for emitting a gas flame for heating the furnace heat exchanger, and the above-mentioned gas flow control valve, positioned between the furnace heat exchanger and the hot water tank.

The gas flow control valve is connected to both the outlet of the furnace heat exchanger and the bottom of the hot water tank. The gas flow control valve has a hollow tubular valve body having a bottom inlet and a top outlet, with a side wall having at least one side wall opening defined therein and passing therethrough, as well as a bottom gate and side wall gate which slides over and closes the bottom inlet and side wall opening, respectively, of the valve body. The bottom gate and side wall gate are actuated by a solenoid connected to the furnace control system.

Outside combustion air is drawn into a furnace gas burner positioned below a furnace heat exchanger for heating air which is then passed through a heat exchanger for heating forced or space air. The heat of combustion then passes into a gas flow control valve positioned above the furnace heat exchanger, and below a hot water tank having a separate water tank gas burner, so that the heat of combustion from the furnace gas burner either heats water within the hot water tank as it passes upward through a heat exchanger within or surrounding the hot water tank, or the heat of combustion acts as preheated combustion air for the water tank gas burner.

The gas flow control valve can selectively direct the heat of combustion from the furnace gas burner and furnace heat exchanger toward the water tank gas burner, or the gas flow control valve can selectively direct outside combustion air toward the water tank gas burner.

The combination hot air furnace and hot water heater also practices a method for heating air and the water, in which fuel is burned in the furnace burner for providing heat of combustion, the heat of combustion is then passed through a furnace heat exchanger over which an air flow is externally passed for heating a forced air flow, the heat of combustion is then passed through a gas, or combustion air, flow control valve whereupon the heat of combustion is used to heat water. The method practiced by this invention further comprises the steps of turning off the furnace burner, closing the gas flow control valve so that the water tank burner is isolated from the furnace heat exchanger, and then drawing outside combustion air through the gas flow control valve, burning a fuel in a water tank gas burner for providing hot combustion products, then passing these hot combustion products through or around the hot water tank for heating water held therein.

Accordingly, it is an object of the present invention to provide a combination hot air furnace and hot water heater for economically providing heated air and heated water in either a commercial or residential structure in an integral assembly.

Another object of the present invention is to provide a combination hot air furnace and hot water heater with increased system efficiency in which the heat of combustion from the furnace gas burner is utilized to heat water within the hot water tank, or to provide preheated combustion air for the hot water tank gas burner, prior to being exhausted out of the system.

It is another object of the present invention to provide a compact, stacked, integrated hot air furnace and hot water tank which will require less utility space within a structure, and where the device can be quickly and economically installed or retrofit into an existing application utilizing existing ducting for air handling purposes, and for connection to exiting gas and water utility lines.

A further object of the present invention is to provide an integrated hot air furnace and hot water heater which can be utilized in decentralized applications throughout a residential or commercial structure so that both hot air and hot water can be provided in defined zones within the structure for quicker response to demand for either hot air or hot water.

A still further object of the present invention is to provide an improved hot air furnace and hot water heater for providing both heated air and heated water that is inexpensive to manufacture and maintain, is durable and will provide a long service life, and which is adaptable for use within commercial or residential structures, as well as in recreational vehicles, mobile homes, and other utility installations.

Other objects, features, and advantages of the invention will become apparent upon reading the specification when taken in conjunction with the accompanying drawings.

DETAILED DESCRIPTION OF THE PREFERRED EMBODIMENT

Figure 1:
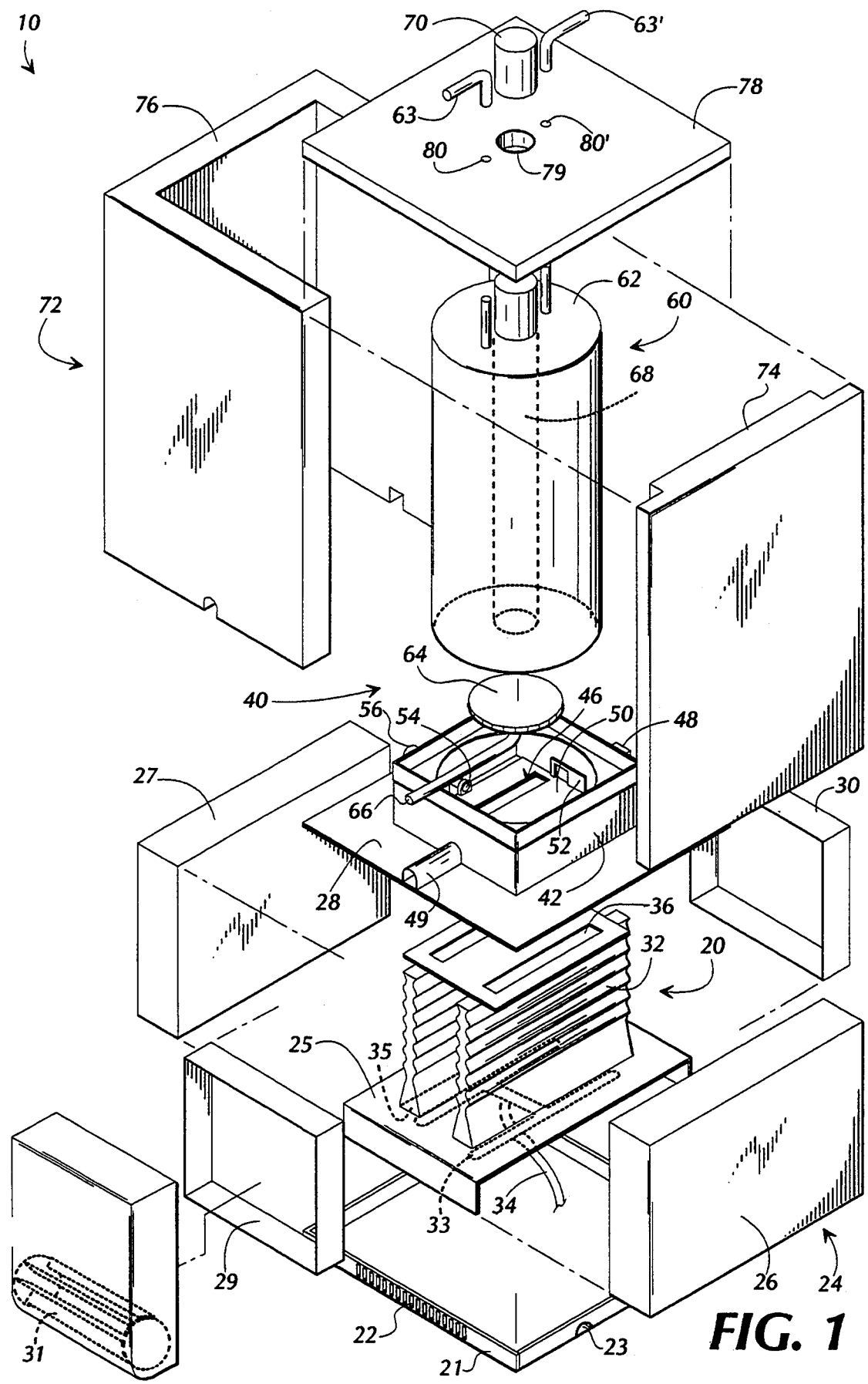
FIG. 1 is an exploded perspective view of the preferred embodiment of the combination hot air furnace and hot water heater.

Referring now in more detail to the drawings, in which like reference numerals indicate like parts throughout the several views, FIG. 1 illustrates a combination hot air furnace and hot water heater 10 which has a hot air furnace 20, a gas flow control valve 40, and a hot water heater 60. Hot air furnace 20 is configured as a conventional gas hot air furnace in which either liquid propane or natural gas will be used as the fuel for producing hot air within the furnace. Furnace 20 has a generally rectangular base 21 having a plurality of combustion air inlets 22 defined therein, as well as a furnace gas line inlet 23 through which furnace gas line 34 will be passed to furnace gas burner 33.

As seen in FIG. 1, furnace 20 also has a conduit 24 which itself has bottom panel 25, side panels 26 and 27, and top panel 28. Panels 25, 26, 27, and 28 are connected along their common horizontal edges, and thus define conduit 24 through which return air is passed from return air inlet 29. Heated air then exits conduit 24 through heated air outlet 30. Blower 31, located at the return air inlet 29 of conduit 24, provides the means for drawing return air from throughout the structure in which the invention is installed. Blower 31 moves return air across furnace heat exchanger 32, supported within conduit 24, for heating the return air prior to its being forced out of conduit 24 through heated air outlet 30. Thereafter, the now heated air is passed into ducting (not illustrated) which carries the heated air throughout the structure in which the preferred embodiment is installed.

Furnace 20, illustrated in FIG. 1, also includes furnace heat exchanger 32 supported within conduit 24. Furnace heat exchanger 32 is conventionally constructed as a finned conduit through which the heat of combustion will be passed. Furnace 20 also has a gas burner 33 to which furnace gas line 34 is connected for providing the fuel for combustion within the furnace gas burner, and furnace heat exchanger inlet 35 and furnace heat exchanger outlet 36. Combustion air is drawn into furnace 20 where it is mixed with the furnace fuel gas into a fuel-air mixture which is combusted by furnace gas burner 33. The heat of combustion then passes through furnace heat exchanger 32, supported in conduit 24, through top plate 28 and into gas flow control valve 40.

Furnace 20 is conventionally constructed as a gas furnace. Base 21 is constructed as a conventional welded square steel tube frame in the shape of a rectangular box, to which conduit 24 is attached through conventional means (not illustrated). Bottom panel 25, side panels 26 and 27, top panel 28, and return air inlet 29 and heated air outlet 30 are constructed of sheet or rolled steel typically used in gas furnaces. Furnace gas burner 33 is a standard crossover or "H" burner assembly which has two or more stamped steel mixing chambers connected together with a crossover tube to provide simultaneous ignition of each burner tube. Furnace gas burner 33 has a conventional pilot light and control system, illustrated in FIG. 4.

Those familiar with this field of art will appreciate that any conventional gas, or oil fired, burner may be used to produce the heat of combustion passed through furnace heat exchanger 32 for heating air within the structure. Fuel gas, either natural gas or liquid propane, is combusted with air drawn into the furnace in furnace gas burner 33. The heat of combustion, and the combustion gases themselves, then pass through furnace heat exchanger 32, entering furnace heat exchanger inlet 35, and are exhausted out of the furnace heat exchanger through furnace heat exchanger outlet 36 and top panel 28 into gas flow control valve 40. Furnace gas burner 33 is located and conventionally supported within base 21 immediately below bottom panel 25 and furnace heat exchanger 32. Furnace gas burner 33 may also be located and supported within furnace heat exchanger 32.

Blower 31 is a standard direct drive squirrel cage fan or other type of fan conventionally used in forced air furnaces, and is driven by any commercially available electric motor used in forced air furnace installations. In this invention a two speed motor will be used. It is anticipated that the electrical motor (not illustrated) for blower 31 would be operated at two speeds, medium and high, with medium speed used to pass a proper flow rate of air across heat exchanger 32 for providing hot air within the structure, and high speed being used to supply a proper flow rate of air across an evaporator core 93, illustrated in FIG. 4, for providing cooled air, or merely for blowing ambient air, throughout the structure in which the invention is installed. Lastly, although not illustrated in FIG. 1, the return air ducting to, and heated or cooled air ducting from the furnace will be conventional ducting utilized in either commercial or residential structures, depending upon design requirements for the space to be heated or cooled.

Again referring to FIG. 1, gas flow control valve 40 is mounted on top of top panel 28 of furnace 20. Bottom inlets 44 of gas flow control valve 40 are sealed to furnace heat exchanger outlets 36 so that the heat of combustion produced by furnace gas burner 33 will pass through furnace heat exchanger 32 and into gas flow control valve 40 prior to being passed toward hot water heater 60.

Figure 2:
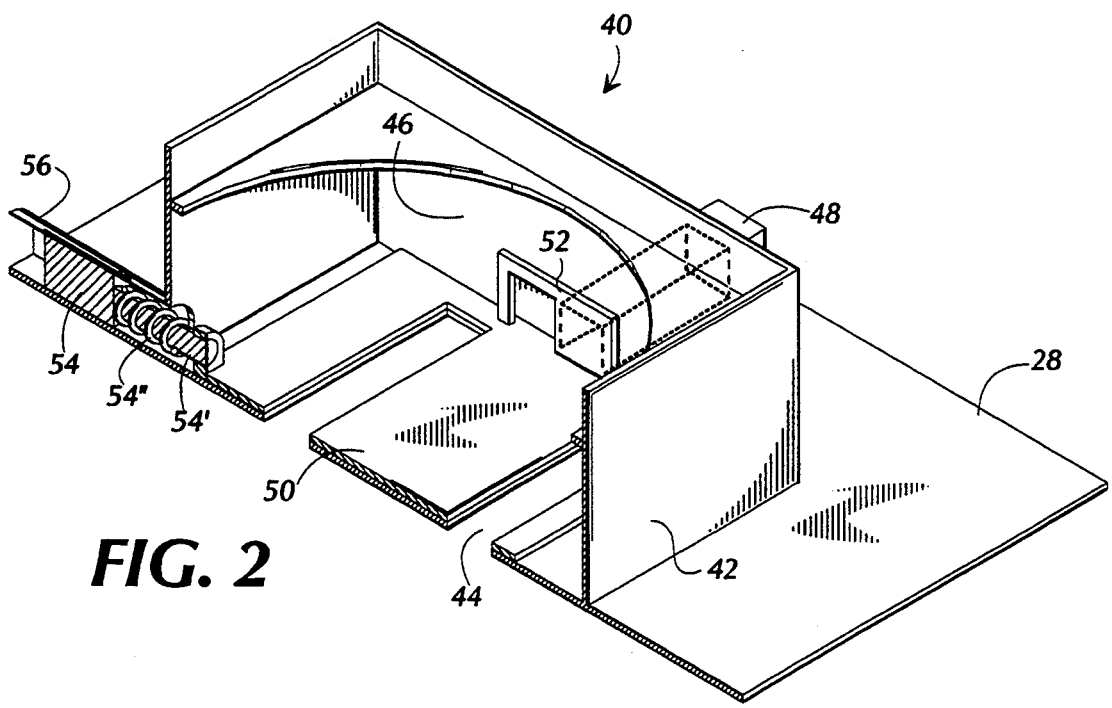
FIG. 2 is a cut-away perspective view of the gas control valve of the hot air furnace and hot water heater shown in its open position.
Figure 3:
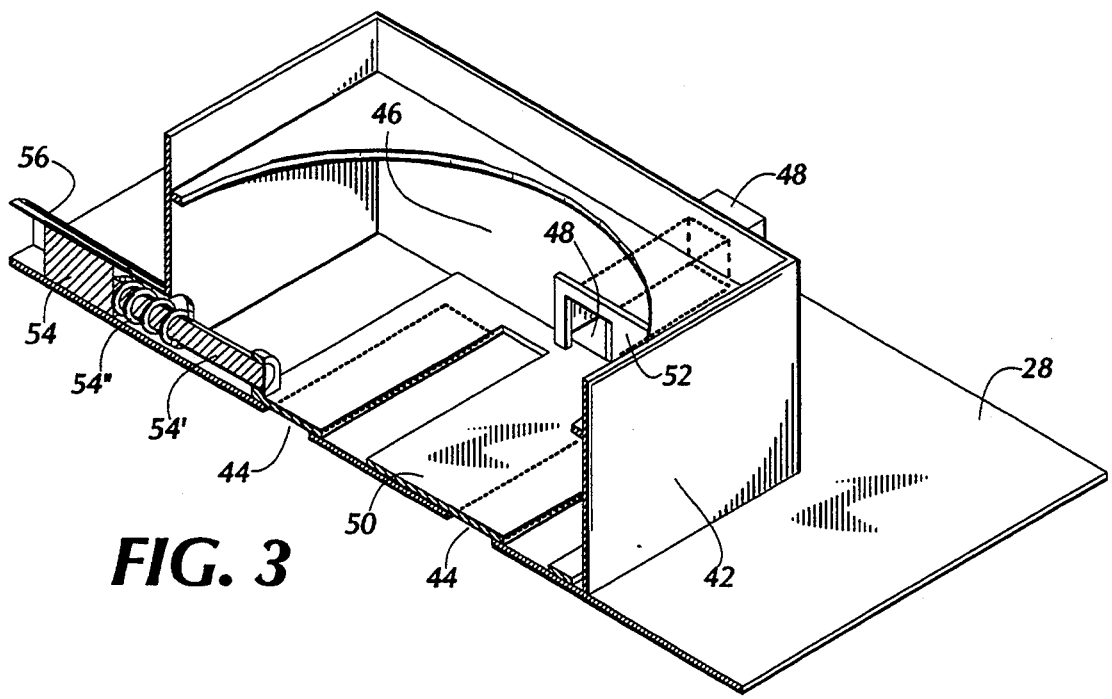
FIG. 3 is a cut-away perspective view of the gas flow control valve of the hot air furnace and hot water heater shown in its closed position.

Referring now to FIG. 2, gas flow control valve 40 is illustrated in a partial cut-away perspective view in its open position wherein the heat of combustion from furnace gas burner 33 passes through furnace heat exchanger 32, top plate 28, and into valve body 42 of gas flow control valve 40 through bottom inlets 44. The heat of combustion, once directed into valve body 42, will then pass through gas flow control valve 40 and through top outlet 46. In addition to bottom inlets 44, side wall opening 48 is defined within the side wall of valve body 42, and passes therethrough into the valve body. This is illustrated in FIG. 3, where it is shown that bottom gate 50 and side wall gate 52 have been moved by actuator 54 so that side wall opening 48 is open for selectively directing outside combustion air toward and into valve body 42, for use in providing outside combustion air for water tank gas burner 64, illustrated in FIG. 1.

Referring now again to FIG. 2, gas flow control valve 40 is supplied with a bottom gate 50 and a side wall gate 52 attached to each other along their common horizontal edges. Gates 50 and 52 are operated by a valve actuator 54, housed within actuator housing 56. The structural components of gas flow control valve 40 are constructed of mild steel hot rolled plate. Valve body 42 is mounted upon top panel 28, and bottom inlets 44 are aligned with the outlets 36 of the furnace heat exchanger which correspond in size and shape to bottom inlets 44. The interior surfaces of valve body 42, including bottom gate 50 and side wall gate 52, are insulated with a woven ceramic fibercloth to prevent radiant heat energy from water tank gas burner 64 entering furnace heat exchanger 32 downwardly through gas flow control valve 40 when the gas flow control valve is closed, as illustrated in FIG. 3.

Valve actuator 54, which opens and closes bottom gate 50 and side wall gate 52, respectively, will be a conventional electrical solenoid, in which plunger 54' travels horizontally to open or close bottom gate 50 and side wall gate 52. It is anticipated that the solenoid of valve actuator 54 will be operated on an electrical current of 115 volts AC, and will be rated for continuous duty. Valve actuator 54 would be conventionally configured with a return spring 54" so that when the solenoid is energized it pulls the plunger 54' of valve actuator 54 into actuator housing 56, thus configuring gas flow control valve 40 in its open position as shown in FIG. 2. After power is removed from the solenoid and valve actuator 54, the solenoid spring 54" held within actuator 56, forces plunger 54' to the closed position, as illustrated in FIG. 3, in which bottom gate 50 seals bottom inlets 44. Valve actuator 54 and actuator housing 56 are sealed to valve body 42.

When gas flow control valve 40 is in its open position as shown in FIG. 2, bottom inlets 44 are open so that the heat of combustion from furnace heat exchanger 32 passes into valve body 42, while at the same time side wall gate 52 has closed side wall opening 48. As illustrated in FIG. 3, when gas flow control valve 40 is in its closed position, bottom gate 50 slides across bottom inlets 44, thus sealing and isolating furnace heat exchanger 32 from the gas flow control valve. When bottom gate 50 is closing, side wall gate 52 is being moved into its open position so that side wall opening 48 is opened and outside combustion air is then drawn into valve body 42.

Referring now to FIG. 1, a water heater gas line inlet 49 passes through valve body 42 for providing a pathway in which water tank gas line 66 is connected to water tank gas burner 64. Water tank gas line 66 will be sealed to valve body 42 within inlet 49. Still referring to FIG. 1, water tank 62 of hot water heater 60 will be sealingly mounted upon the top of gas flow control valve 40 and encloses top outlet 46 of the gas flow control valve.

As illustrated in FIG. 1, hot water heater 60 includes water tank 62 having cold water inlet 63 and hot water outlet 63' passing through the top surface of water tank 62. Hot water heater 60 is also provided with water tank gas burner 64 which is supplied with fuel by water tank burner gas line 66 passing through water heater gas line inlet 49 and valve body 42. Water tank 62 also has a water tank heat exchanger 68 through which the heat of combustion from either furnace gas burner 33, or water tank gas burner 64, or both, is passed, for heating water held within water tank 62, prior to passing the heat of combustion out of the combination hot air furnace and hot water heater 10 through flue 70.

Water tank 62 is constructed as a conventional water tank, and thus it is anticipated that it will be constructed from cast iron, will be glass lined, and contain a magnesium sacrificial anode (not illustrated) to prevent tank corrosion. It is also anticipated that water tank 62 will be designed to withstand at least 300 psi internal pressure without leakage or structural deformation. Of course, the design specification of water tank 62 can be varied depending upon the uses and purposes in which hot air furnace and hot water tank heater 10 is installed. Additionally, water tank 62, although illustrated as having an internal or center type having water tank heat exchanger 68, can also be conventionally constructed and configured as an external channel flue, multi-flue, or external flue and floating tank water tank.

Still referring to FIG. 1, water tank gas burner 64 is supported entirely within valve body 42 of gas flow control valve 40. Water tank gas burner 64 may be constructed of different designs, such as a vertical drilled, horizontal slot, or stamped horizontal port burner. A stamped horizontal port burner 64 is illustrated in FIG. 1. Water tank gas burner 64 will be selected such that the BTU output of the burner will be suitable for heating the water in the tank as the sole source of heat energy input in the event that hot air furnace 20 is turned off, and bottom gate 50 of gas flow control valve 40 is in its closed position, as illustrated in FIG. 3.

Combustion air for water tank gas burner 64 is provided either through bottom inlets 44, or side wall opening 48 of gas flow control valve 40 dependent upon whether hot air furnace 20 is in operation. By being sealed to furnace heat exchanger 32, gas flow control valve 40 permits a method for selectively directing and passing either the heat of combustion from furnace gas burner 33 through water tank heat exchanger 68 for heating water within water tank 62, or for providing preheated combustion air for water tank gas burner 64. When gas flow control valve 40 is in its closed position, as illustrated in FIG. 3, outside combustion air will be drawn through side wall opening 48 for providing outside combustion air for water tank gas burner 64.

As shown in FIG. 1, gas flow control valve 40, and hot water heater 60 of combination hot air furnace and hot water heater 10 are enclosed by and within housing 72. Housing 72 comprises front cover 74, connected to back and side cover 76. Although back and side cover 76 is shown here as an integrated panel assembly, those skilled in the art will recognize that a number of separate panels may be used in lieu of one panel. Housing 72 also comprises top panel 78, having a cold water inlet 80 and a hot water outlet 80' defined therein, as well as exhaust flue opening 79 defined therein for receiving exhaust flue 70.

Housing 72 is constructed of sheet metal or thin rolled steel sheet, and panels 74, 76, and 78 are constructed as hollow or sandwich panels in which a conventional insulation material (not illustrated) is placed. Thus, housing 72 acts as a second insulating shell for water tank 62. Also, housing 72 is mounted upon and sealed to conduit 24, illustrated in FIG. 1. As with panels 74, 76, and 78, conduit side panels 26 and 27 are also constructed as hollow or sandwich panels having insulating material (not illustrated) held within.

Figure 4:
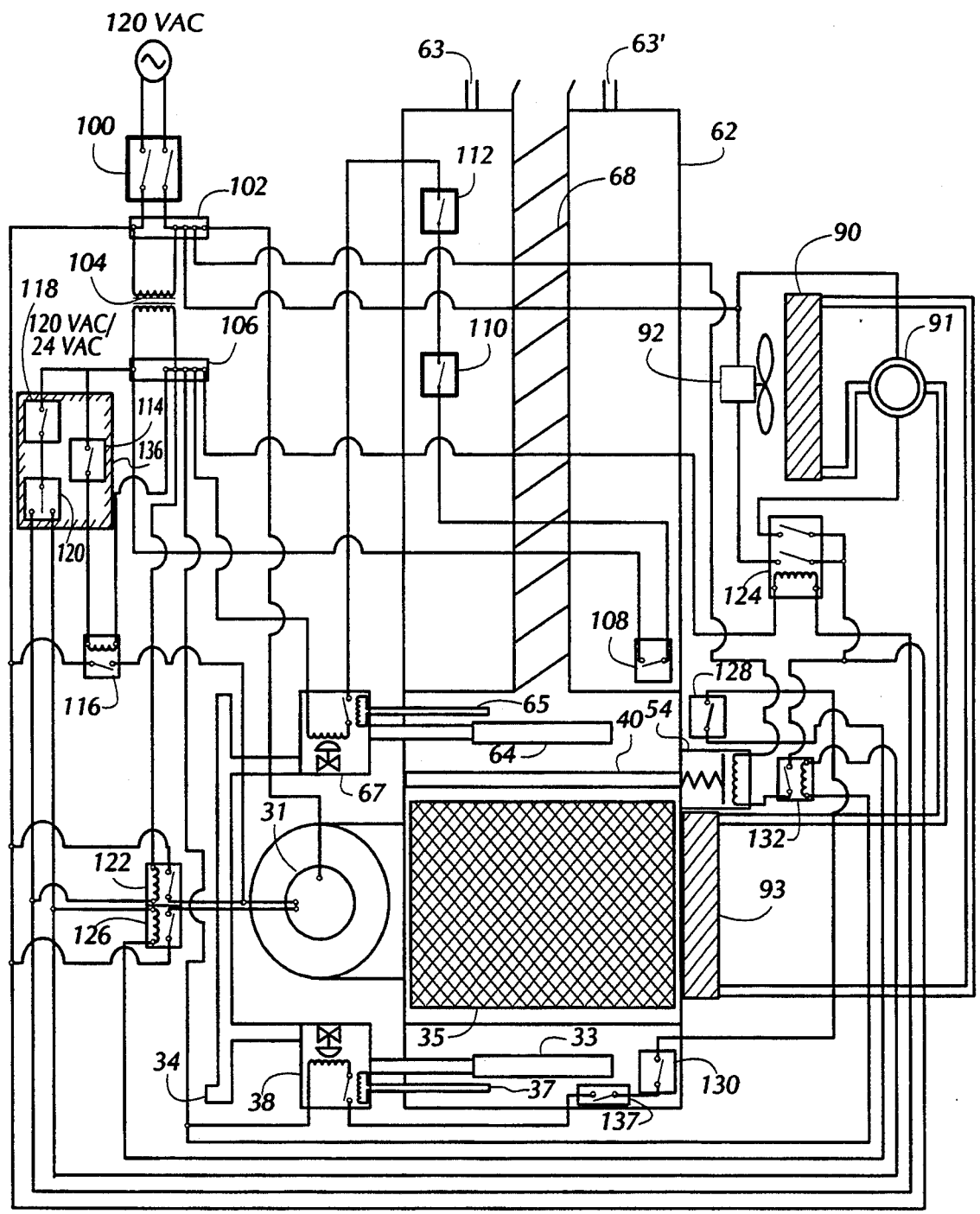
FIG. 4 is a schematic of the electrical control systems and piping for the combination hot air furnace and hot water heater illustrated in FIG. 1.

Referring now to FIGS. 1 and 4, the operation of the preferred embodiment in its various modes of operation will be discussed.

As shown in FIG. 4, when used as a hot air furnace, the hot air furnace control circuit operates blower 31, furnace gas valve 38, and valve actuator 54. The circuit is controlled by thermostat 136 located separately within the structure in which the invention is installed. When the room temperature falls below a preset temperature, the contacts on thermostatic switch 118 close, which completes the current path to the air conditioning/heat/off switch 120 provided on thermostat 136. Switch 120 is set on the heat position which completes the current path for the two branches of the circuit. The first path of the circuit is connected to gas flow control valve solenoid relay 132, illustrated in FIG. 4, which in turn is connected to the common side of transformer 104. With relay 132 activated, a 120 volt AC circuit is completed to operate valve actuator 54. The second branch of the control circuit is configured in series, in which the 24 volt AC current path is routed from the furnace medium speed relay 126 and then passes through gas flow control valve position switch 128, which senses the position of gas flow control valve 40, assuring that it is open, as illustrated in FIG. 2, prior to allowing furnace burner 33 to ignite.

The series current path is also routed to furnace cover interlock switch 130, and then to the safety thermostat overheat switch 137, which will open in the event the temperature within furnace 20 increases above 300° F. at bottom plate 25 of conduit 24. The control circuit is then connected to the furnace burner gas valve 38, a solenoid valve, which will open to supply gas to furnace gas burner 33 if pilot 37 is lit. The electrical control circuit then runs out of furnace gas valve 38 to the common side of transformer 104.

Thus, furnace burner 33 will only ignite if the following conditions are met, gas flow control valve 40 is in its open position as illustrated in FIG. 2, front cover 74 is installed upon furnace housing 72, illustrated in FIG. 1, the furnace is not overheating, and pilot light 37, illustrated in FIG. 4, is lit. Water tank gas burner 64 is permitted to ignite at the same time furnace burner 33 is ignited if the water temperature in water tank 62 drops below the thermostat setting of hot water heater thermostat 110. In this instance, water tank gas burner 64 would receive preheated combustion air from furnace gas burner 33. Water tank gas burner 64 is configured so that the primary air used for mixing with the fuel gas prior to combustion would be drawn either from the atmosphere outside of gas flow control valve 40 through side wall opening 48 into valve body 42, or through combustion air inlets 22 when the gas flow control valve is open to furnace heat exchanger 32.

Referring still to FIGS. 1 and 4, water is heated in hot water heater 60 when cold water enters water tank 62 through cold water inlet 63. The control circuit for hot water heater 60 begins at transformer 104 which is configured in series. The current path is routed to the hot water heater cover interlock switch 108 on front panel 74, which prevents water tank gas burner 64 from turning on in the event front cover 74 is removed. With cover interlock switch 108 closed, the current then passes through hot water heater thermostat 110 which closes when the water temperature has dropped below the set temperature level. Thereafter, the circuit path passes through automatic gas shut off switch 112, which is a safety switch used to turn off water tank gas burner 64 in the event that hot water heater thermostat 110 sticks in a closed position. The control circuit is then connected to the hot water heater gas valve 67, which will only supply gas to water tank gas burner 64 if pilot light 65 is lit. The electrical control circuit then runs out of hot water gas valve 67 to the common side of transformer 104.

Thus, water tank gas burner 64 will only ignite if the following conditions are met, front cover 74 of housing 72 is installed, thermostat 110 senses a water temperature within water tank 62 lower than the thermostat setting, and pilot 65 is producing electrical current, meaning that pilot 65 is lit. Hot water will then exit water tank 62 through hot water outlet 63' passing through opening 80' of top cover 78 of housing 72.

Still referring to FIGS. 1 and 4, hot air furnace and hot water heater 10 may be utilized in an air conditioning mode rather than as a hot air furnace. As illustrated in FIG. 4, the hot air furnace and hot water heater is provided with an air conditioner condenser 90, an air conditioner compressor 91, an air conditioner condenser fan 92, and an air conditioner evaporator core 93. Evaporator core 93 would be placed within the outlet duct (not illustrated) connected to heated air outlet 30 of furnace 20. The air conditioning circuit is controlled by thermostatic switch 118 found within thermostat 136 located in the structure to be cooled. When the room temperature rises above a preset temperature, the contacts on thermostatic switch 118 close, which completes the current path from transformer 106 to the air conditioning/heat/off switch 120 located on the thermostat. When switch 120 is set to the air conditioning position, this completes the current path to the air conditioning high speed fan relay 122, which in turn is connected to the common side of transformer 104. The air conditioning control circuit path is also completed to the compressor/condenser fan relay 124, which is in turn connected to the common side of transformer 104. With relays 122 and 124 activated, a 120 volt AC electrical circuit is completed to power the space air blower 31, as well as condenser fan 32, and compressor 91.

In the air conditioning mode of operation, return space air is blown across evaporator core 93 and passed through the conditioned air ducting throughout the structure in which the invention is installed. Air conditioning/heat/off switch 120 is a single throw double pole switch which restricts the furnace from being activated while the air conditioner is running. When the furnace is in its air conditioning mode, gas flow control valve 40 will not open, thus dividing off water tank gas burner 64 from furnace heat exchanger 32 and conduit 24 so that heated air from water tank gas burner 64 will not otherwise heat the cooled air being passed through conduit 24.

It is also possible to operate blower 31 as a space air blower only, controlled by high speed relay 116, by closing the contacts on the auto/fan on switch 114, located on thermostat 136. This would permit the furnace to move ambient air throughout the structure without heating or cooling the air. As with air conditioning, however, when space air is being blown through the structure, gas flow control valve 40 will be in its closed position as illustrated in FIG. 3.

Thus, it can be seen that the present invention comprises a useful and effective apparatus for providing both hot air and hot water within a compact and integrated apparatus. While the invention has been shown and described as what is presently believed to be the most practical and preferred embodiment thereof, it is understood that modifications and variations within the scope and spirit of the invention are possible, and that the invention is thus to be afforded any and all interpretations so as to encompass all the equivalents thereof, as set forth in the following claims.

I claim:

1. A combination hot air furnace and hot water heater, comprising:

a hot water tank, including a cold water inlet and a hot water outlet;

a water tank gas burner positioned below said water tank for emitting a gas flame for heating said water tank:

a furnace heat exchanger having an inlet and an outlet positioned below said water tank gas burner;

conduit means for directing a flow of air across said furnace heat exchanger;

a furnace gas burner positioned below said furnace heat exchanger for emitting a gas flame for heating said furnace heat exchanger; and gas flow control means positioned between said furnace heat exchanger and said hot water tank for selectively directing the combustion gases and heat of combustion emitted from said furnace heat exchanger to said hot water tank for heating said water tank, and for directing preheated combustion air or outside combustion air to said water tank gas burner in response to the emission of a gas flame from the furnace burner.

2. The hot air furnace and hot water heater of claim 1, wherein said conduit means for directing an air flow across said furnace heat exchanger further comprises:

at least one conduit having an inlet and an outlet, through which said heat exchanger passes internally; and blower means on the inlet side of said conduit for passing an air flow through said conduit and externally across said furnace heat exchanger.

3. The hot air furnace and hot water heater of claim 1, wherein said furnace heat exchanger further comprises at least one finned conduit through which the heat of combustion is passed.

4. The hot air furnace and hot water heater of claim 1, wherein said gas flow control means further comprises a valve.

5. The hot air furnace and hot water heater of claim 4, wherein said valve further comprises:

a hollow tubular valve body, said valve body having a bottom inlet and a top outlet, and a side wall having at least one side wall opening defined therein;

gate means supported within said valve body for opening said bottom inlet and closing said side wall opening for passing the heat of combustion from said furnace heat exchanger into said valve body, and for closing said bottom inlet and opening said side wall opening for drawing outside combustion air into said valve body through said side wall opening, respectively.

6. The hot air furnace and hot water heater of claim 5, wherein said gate means further comprises:

a bottom gate mounted on the bottom inlet of said valve body; and a side wall gate mounted on the side wall opening of said valve body.

7. The hot air furnace and hot water heater of claim 6, wherein said gate means further comprises actuator means for opening and closing each of said gates within said valve body.

8. The hot air furnace and hot water heater of claim 7, wherein said bottom inlet of said valve is sealed to the outlet of said furnace heat exchanger.

9. The hot air furnace and hot water heater of claim 1, wherein said water tank is mounted upon and sealed to the top outlet of said gas flow control means.

10. The hot air furnace and hot water heater of claim 1, wherein said hot water tank further comprises a heat exchanger for heating water with the heat of combustion from said water tank gas burner and said furnace gas burner.

11. The hot air furnace and hot water tank of claim 1, further comprising an insulated housing in which said hot air furnace and hot water heater is enclosed, said housing having a plurality of outside combustion air inlets, at least one opening through which the heat of combustion is exhausted, and at least two openings defined within said housing in communication with said conduit means for directing a flow of air across said furnace heat exchanger, said housing also having a cold water inlet and a hot water outlet defined therein.

12. A combination hot air furnace and hot water heater, comprising:
a hot water tank, including a cold water inlet and a hot water outlet;
a water tank gas burner positioned below said water tank for emitting a gas flame for heating said water tank;
a furnace heat exchanger having an inlet and an outlet positioned below said water tank gas burner;
conduit means for directing a flow of air across said furnace heat exchanger;
a furnace gas burner positioned below said furnace heat exchanger for emitting a gas flame for heating said furnace heat exchanger; and
a valve having an inlet and an outlet through which the heat of combustion can pass, wherein the inlet of said valve is connected to the outlet of said furnace heat exchanger, and the outlet of said valve is directed toward said hot water tank, and wherein said valve comprises a hollow tubular valve body, said valve body having a side wall with at least one side wall opening defined therein for drawing outside combustion air into said valve body, said valve body further comprising gate means, and actuator means for moving said gate means into open and closed positions upon said inlet and said side wall opening for directing the heat of combustion through, or drawing outside combustion air into said valve body in response to the emission of a gas flame from said furnace burner.

13. A method for heating air and water, comprising the steps of:
burning a fuel with a furnace burner for providing heat of combustion:
passing the heat of combustion emitted from the furnace burner through a furnace heat exchanger;
directing an air flow externally across said furnace heat exchanger for heating said air flow;
then passing the heat of combustion emitted from the heat exchanger through a flow control means;
then heating water in a water tank with said heat of combustion;
burning a fuel with a water tank burner to provide additional heat of combustion; and
directing the additional heat of combustion to the water tank for heating water in the tank.

14. The method of claim 13, further comprising the steps of:
terminating the burning of fuel with said furnace burner;
upon terminating the burning of fuel with said furnace burner closing said flow control means so that said water tank burner is isolated from said furnace heat exchanger; and
drawing outside combustion air for said water tank burner through said flow control means.

15. A method of heating air and water, comprising the steps of:
burning a fuel in a first burner for providing hot combustion products;
passing said hot combustion products through a furnace heat exchanger;
directing an air flow externally across said furnace heat exchanger for transferring heat from said combustion products to said air flow;
then passing said hot combustion products through a valve;
then passing said hot combustion products through a second burner and burning a fuel with the second burner for providing additional hot combustion products; and
next passing said hot combustion products through a water tank heat exchanger for heating water.

16. The method of claim 15, further comprising the steps of:
turning off said first burner;
closing said valve so that said second burner is sealed from said furnace heat exchanger; and
drawing outside combustion air through said valve.

17. A method for heating air and water, comprising the steps of:
burning a fuel and air mixture with a furnace burner for providing heated air;
passing the heated air emitted from the furnace burner through a furnace heat exchanger;
directing an air flow externally across said furnace heat exchanger for heating said air flow;
passing the heated air emitted from the heat exchanger through a flow control means;
heating water in a water tank with said heated air passed through the flow control means;
burning a fuel and the heated air with a water tank burner positioned relative to the water tank to provide additional heated air for heating water in said water tank;
terminating the burning of fuel with said furnace burner;
closing said flow control means so that said water tank burner is isolated from said furnace heat exchanger; and
drawing outside combustion air through said flow control means for burning with fuel with said water tank burner.

* * * * *